Nov. 1, 1960  W. G. PRICE  2,958,481
STEERING APPARATUS
Filed July 2, 1956  12 Sheets—Sheet 1

INVENTOR.
WILLIAM G. PRICE
BY John A. Young
ATTORNEY

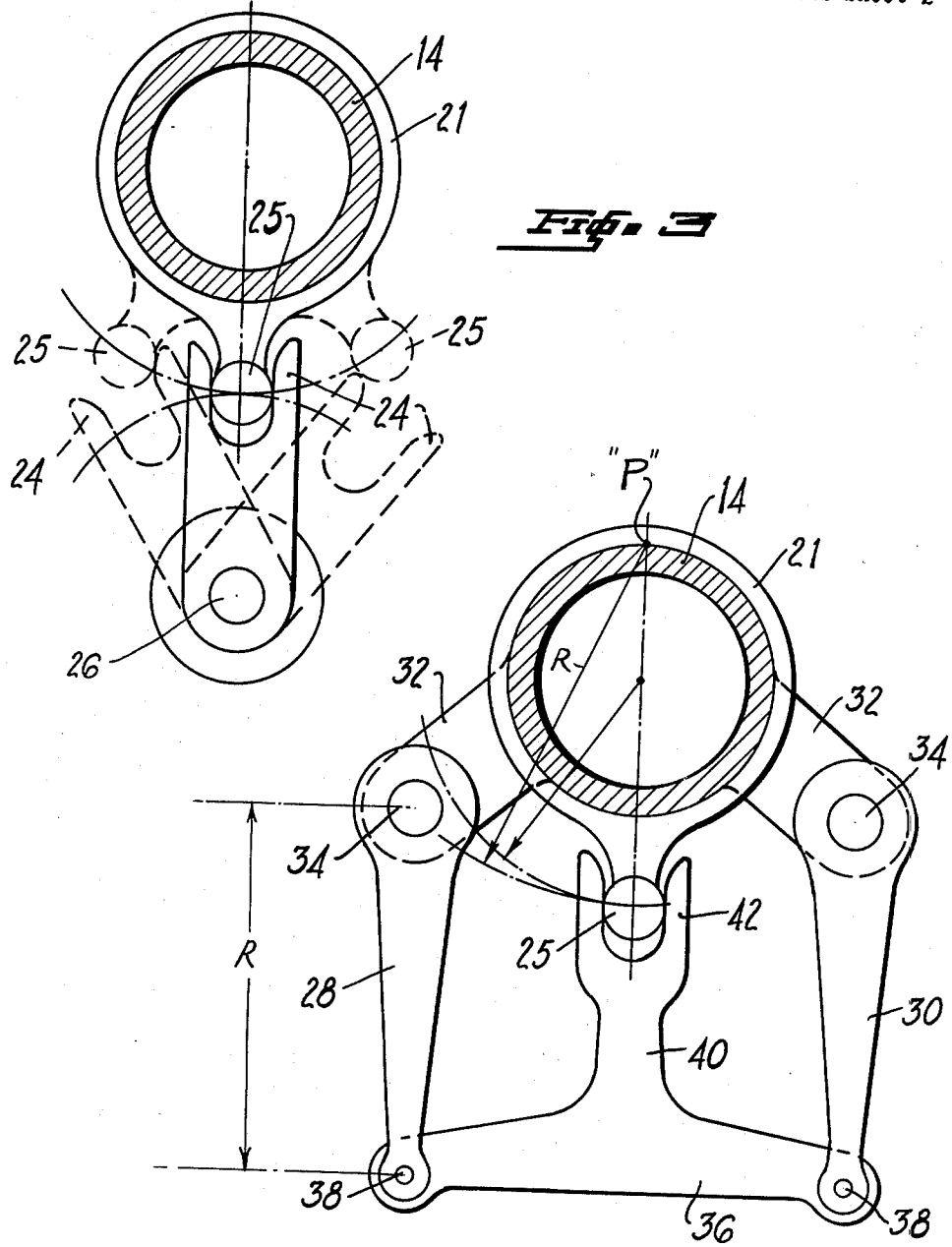

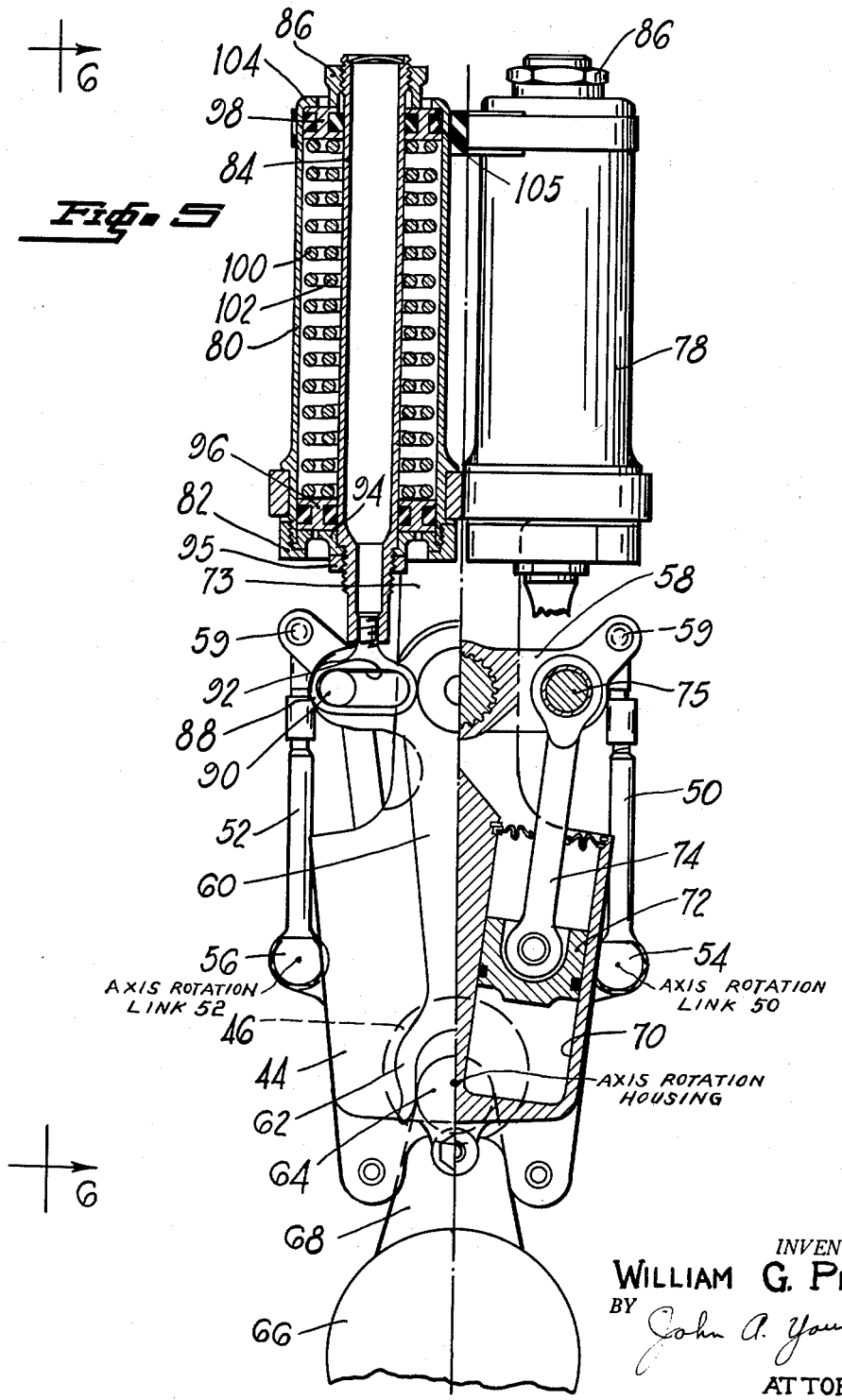

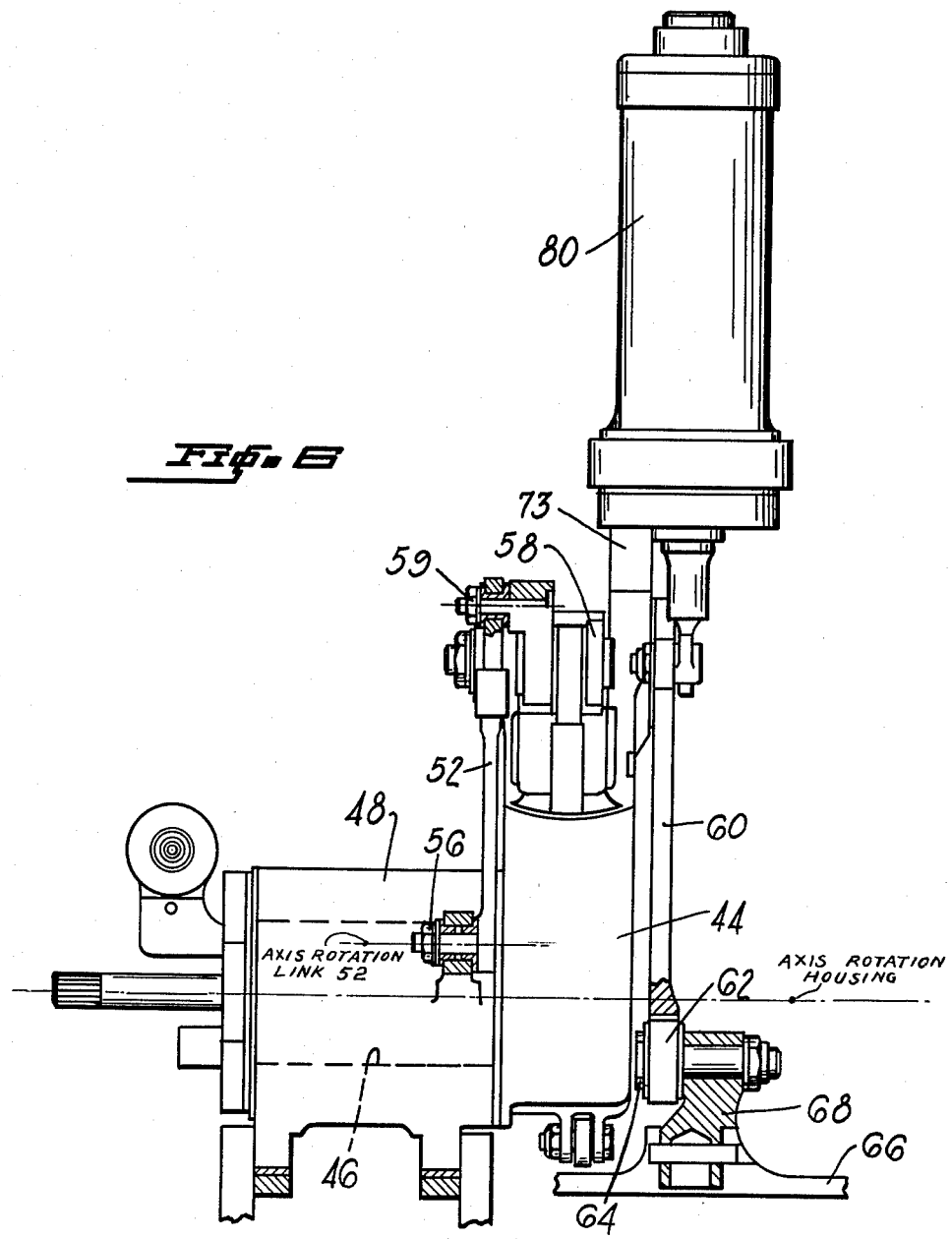

Nov. 1, 1960
W. G. PRICE
2,958,481
STEERING APPARATUS
Filed July 2, 1956
12 Sheets-Sheet 5
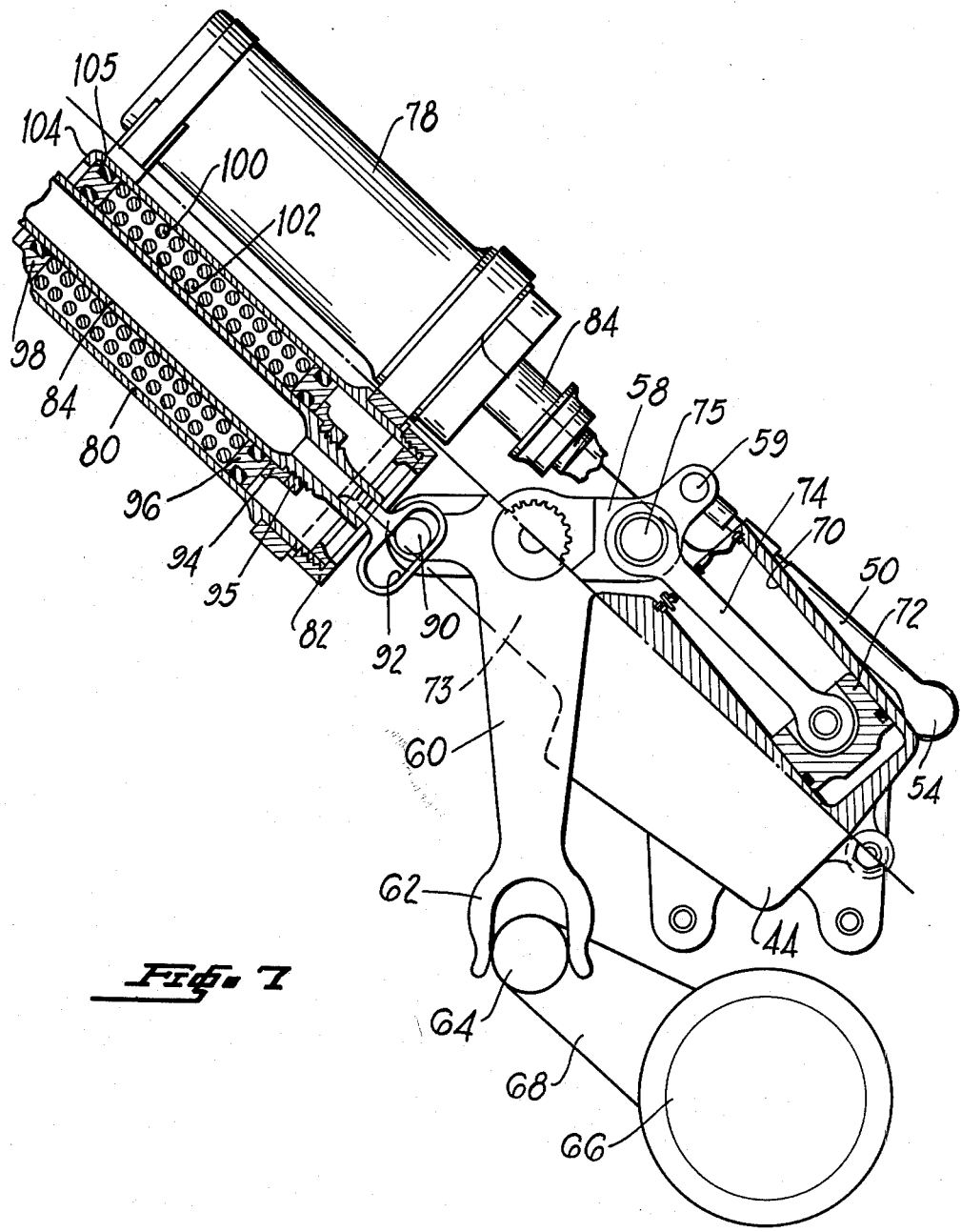
INVENTOR.
WILLIAM G. PRICE
BY
John A. Young
ATTORNEY

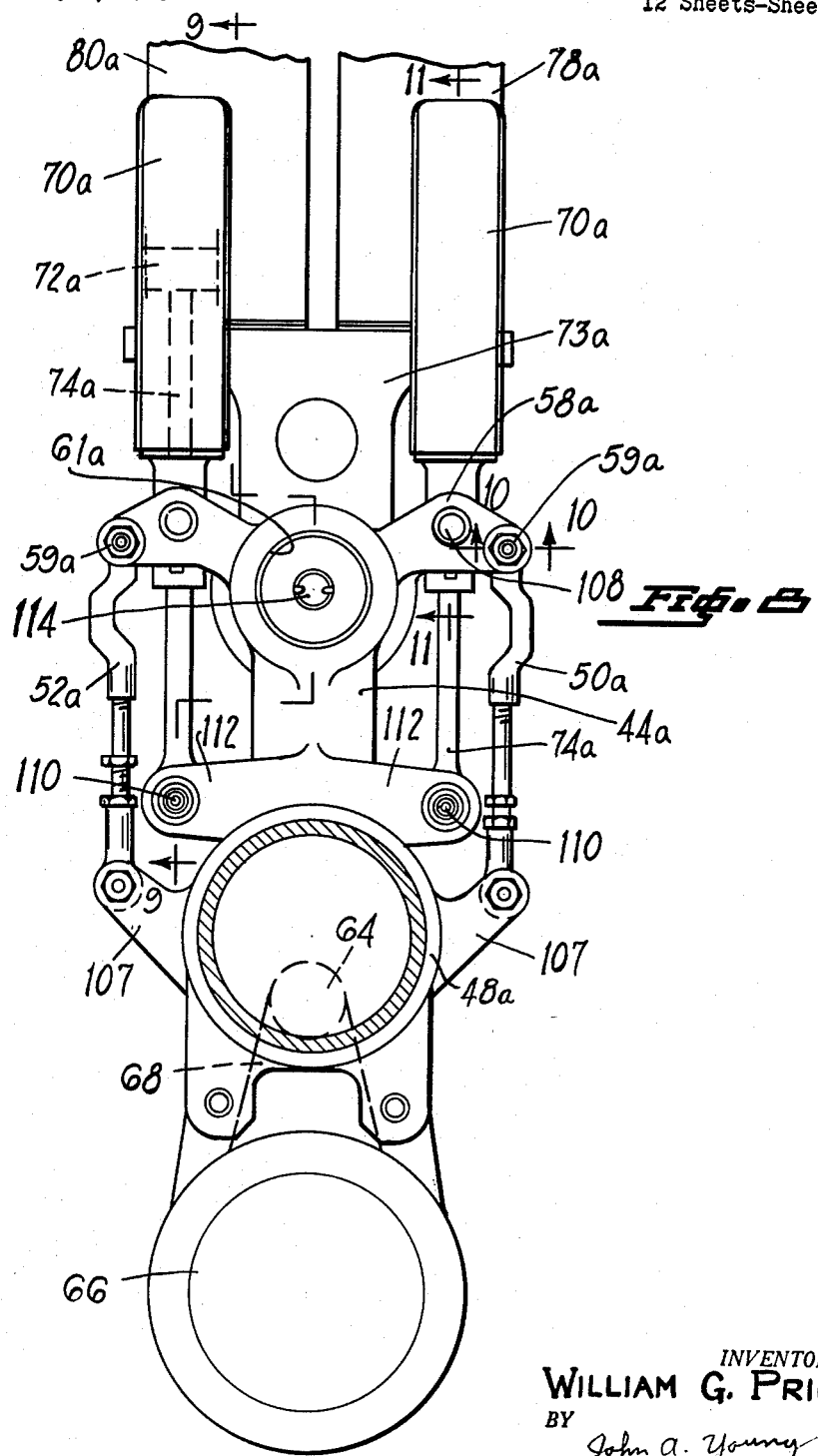

Nov. 1, 1960 W. G. PRICE 2,958,481
STEERING APPARATUS
Filed July 2, 1956 12 Sheets-Sheet 7
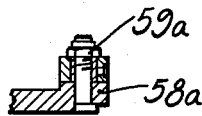
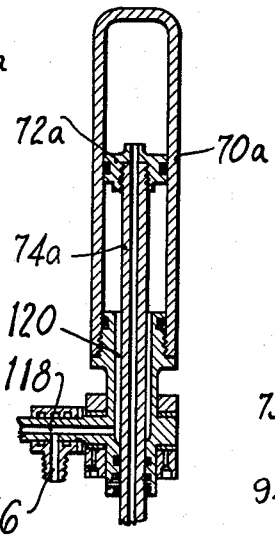
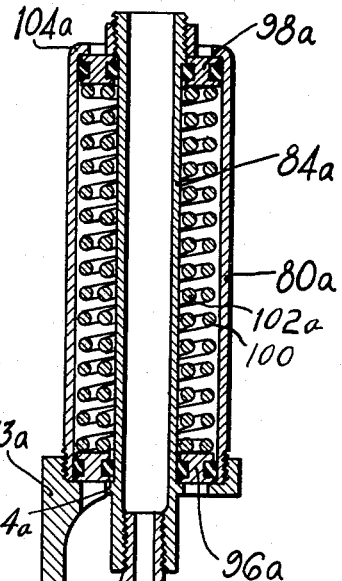
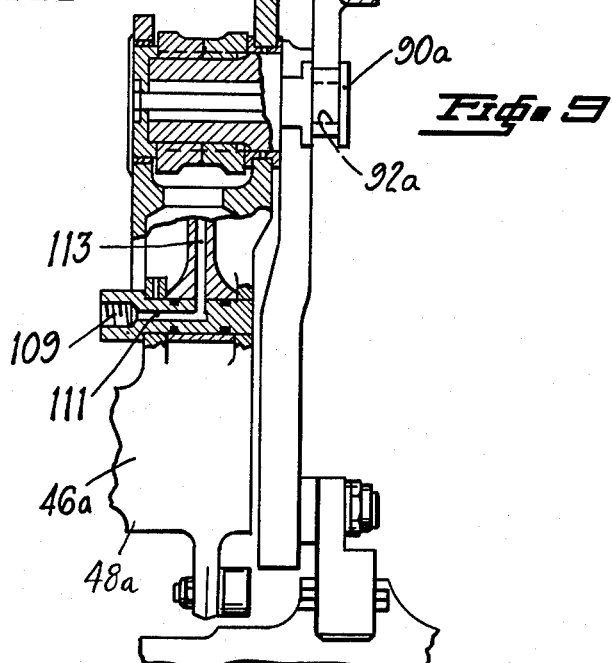
INVENTOR.
WILLIAM G. PRICE
BY
John A. Young
ATTORNEY

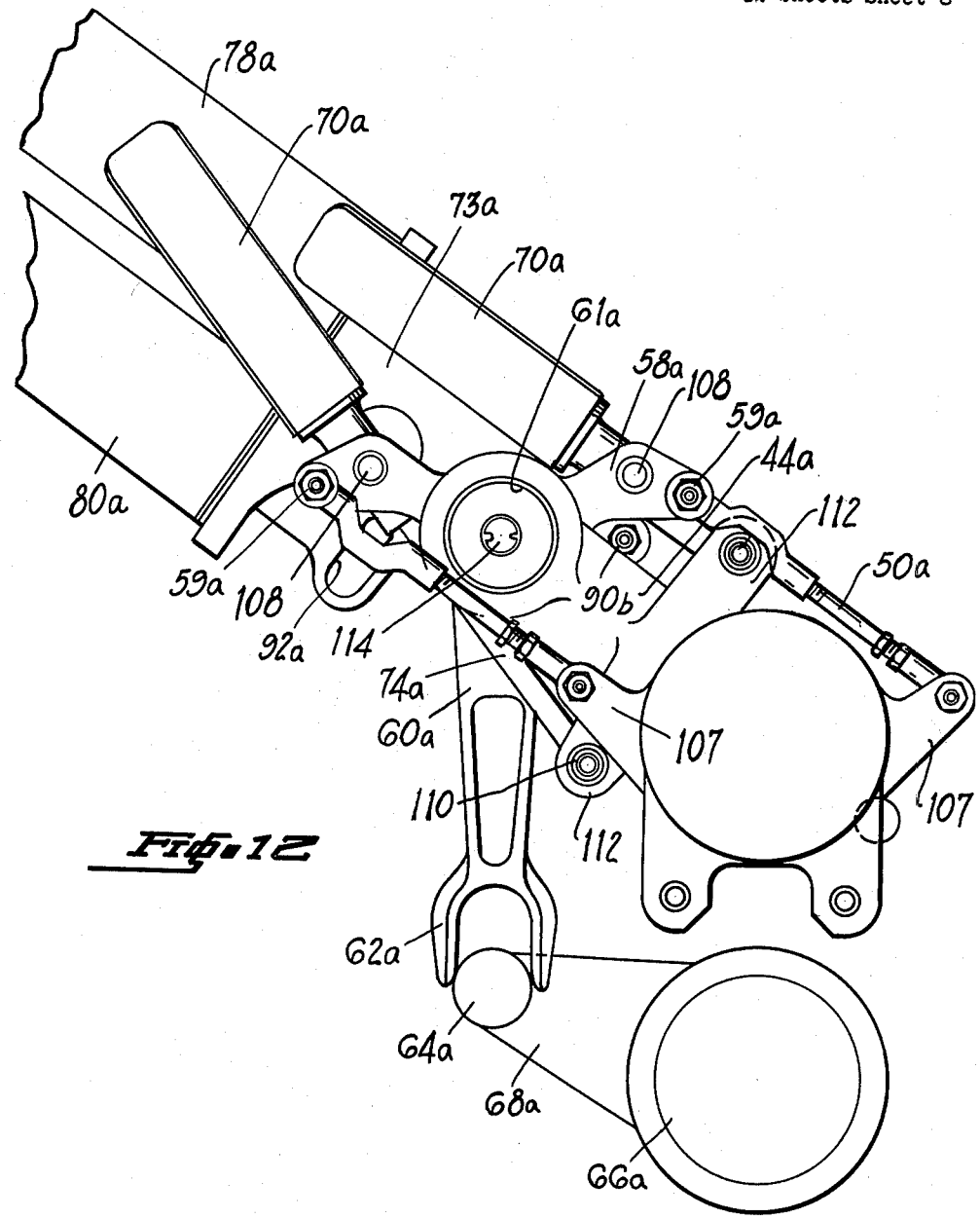

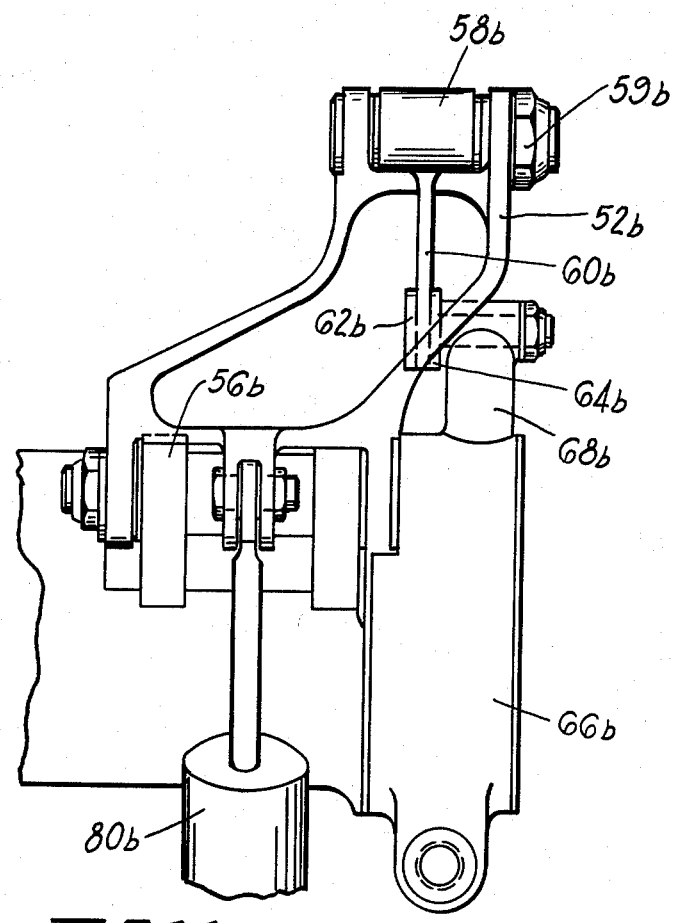

Nov. 1, 1960 W. G. PRICE 2,958,481
STEERING APPARATUS
Filed July 2, 1956 12 Sheets-Sheet 11
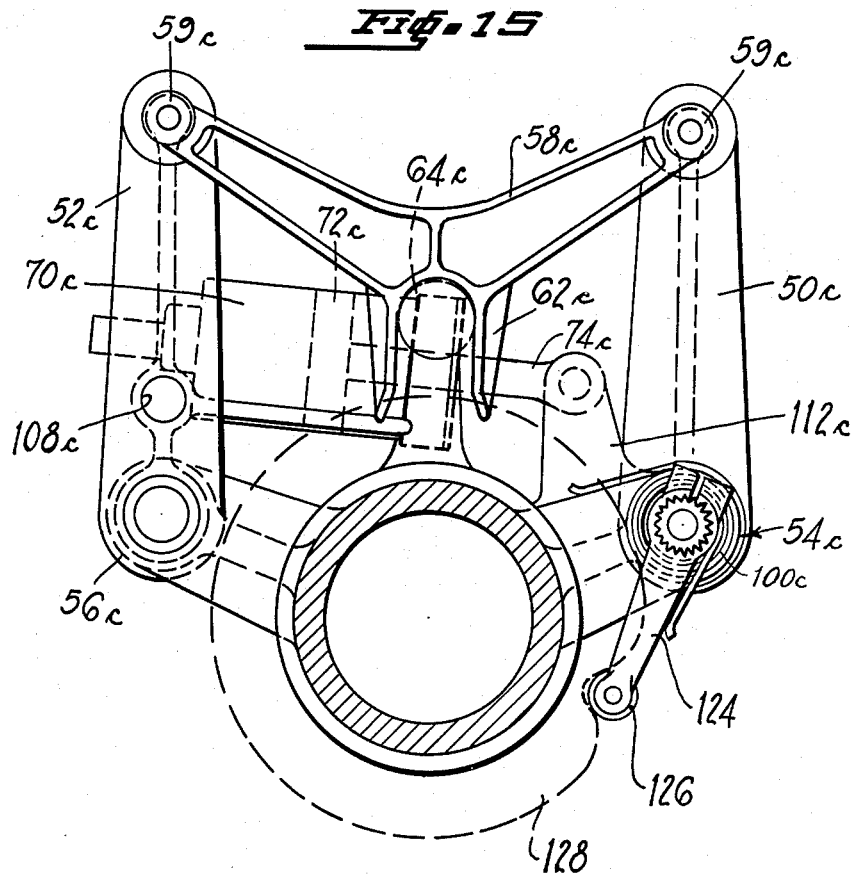
INVENTOR.
WILLIAM G. PRICE
BY
John A. Young
ATTORNEY

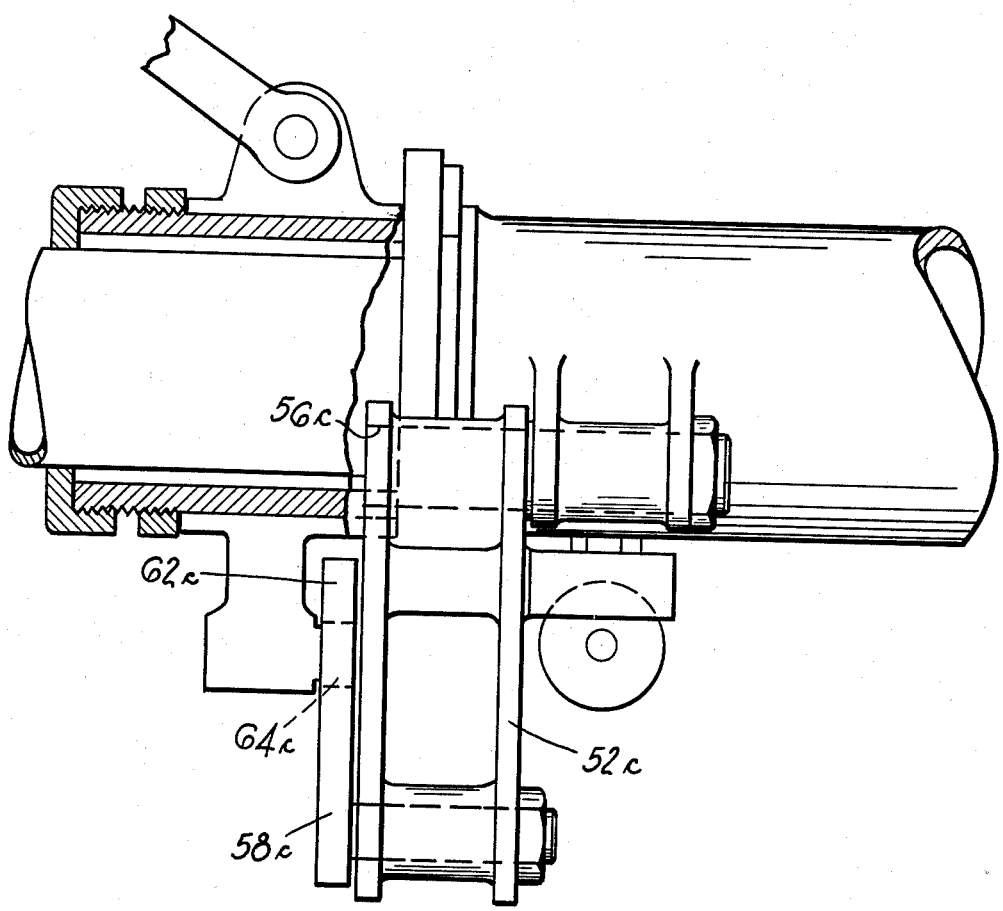

United States Patent Office 2,958,481
Patented Nov. 1, 1960

2,958,481

STEERING APPARATUS

William G. Price, South Bend, Ind., assignor to The Bendix Corporation, a corporation of Delaware Filed July 2, 1956, Ser. No. 595,198

21 Claims. (Cl. 244—50)

This invention relates to a steering apparatus for an aircraft wheel and is used in combination with an aircraft strut.

It was previously the practice in steering aircraft to apply the brakes at one of the wheels which is located on a strut depending from the aircraft wing structure. The propellers or jet of the aircraft would then develop power and the aircraft would swing about the braked wheel which served as a pivot. In later aircraft designs, there was insufficient space in the wings to retract the landing gear and, therefore, the wheels were relocated in the fuselage. These two wheels were brought so closely together that insufficient torque is developed for turning the aircraft about either of the wheels. As a result, it has become necessary to steer the aircraft by turning the nose gear wheel and developing thrust on the aircraft to produce turning about either of the fuselage wheels.

Power steering of aircraft wheels, because of the foregoing considerations, has become almost essential. There are additional advantages involving reduced brake wear, ease of ground handling, and prevention of wheel reversal on naval aircraft owing to landing cable "snap back."

For ground handling purposes, it is also desirable that the nose wheel, in addition to being steerable, should also be capable of swivelling through 360° of movement without involvement of a manual disconnect. Thus, the wheel should be automatically disconnectible from the steering apparatus to permit free rotation of the wheel.

One of the longstanding problems in aircraft steering apparatus is how to obtain power steering of the nose wheel through a wide angularity and yet obtain a full 360° movement of the nose wheel without manually disconnecting the wheel from the steering apparatus. It is an object of the present invention to increase the angularity through which the nose wheel may be power driven by the pilot in order to steer the aircraft; it is a further object of the invention that the wheel will automatically disengage from the power drive mechanism and re-engage therewith in order that the wheel might be freely swivelled through a full 360° of movement.

It is an important feature of this invention that the power steering apparatus automatically becomes reoperatable with the wheel when the wheel is rotated within a prescribed angularity for power steering after the wheel has pivoted through any angle.

It is also an object of the invention to adapt the steering apparatus for service as a shimmy damping means and a wheel-centering means. When the power steering is released, then the wheel centering means will return the steerable components to a normal position. The steering apparatus prevents shimmy of the wheel during landing and taxiing, this tendency to shimmy being inherent in all casterable wheels.

It will thus be seen that the present invention incorporates in a single apparatus the three functions of steering, shimmy damping, and wheel positioning.

There are a number of other considerations which must be taken into account in adapting a steering mechanism for aircraft usage. As is well known, space considerations are highly important in aircraft design. It is an important feature of this invention that the device is constructed to occupy the smallest space possible and is as lightweight as practicable. The device is designed to project outwardly from the strut in order to interfere as little as possible with other parts of the aircraft undercarriage.

The above and other features and objects of the invention will become more apparent from a consideration of the following description which proceeds with reference to the accompanying drawings, wherein:

Figures 2, 3 and 4 are simplified schematic views of different steering arrangements which illustrate the basic steering components and forces involved in steering an aircraft with the various linkage arrangements;

Figure 5 shows a top view of a first embodiment of the invention;

Figure 6 is a side view of the steering apparatus shown in Figure 5;

Figure 7 shows the steering apparatus of Figure 5 in an extreme steering position at one angular limit;

Figure 8 is a top view of a second embodiment of the invention in its normal position;

Figure 13:
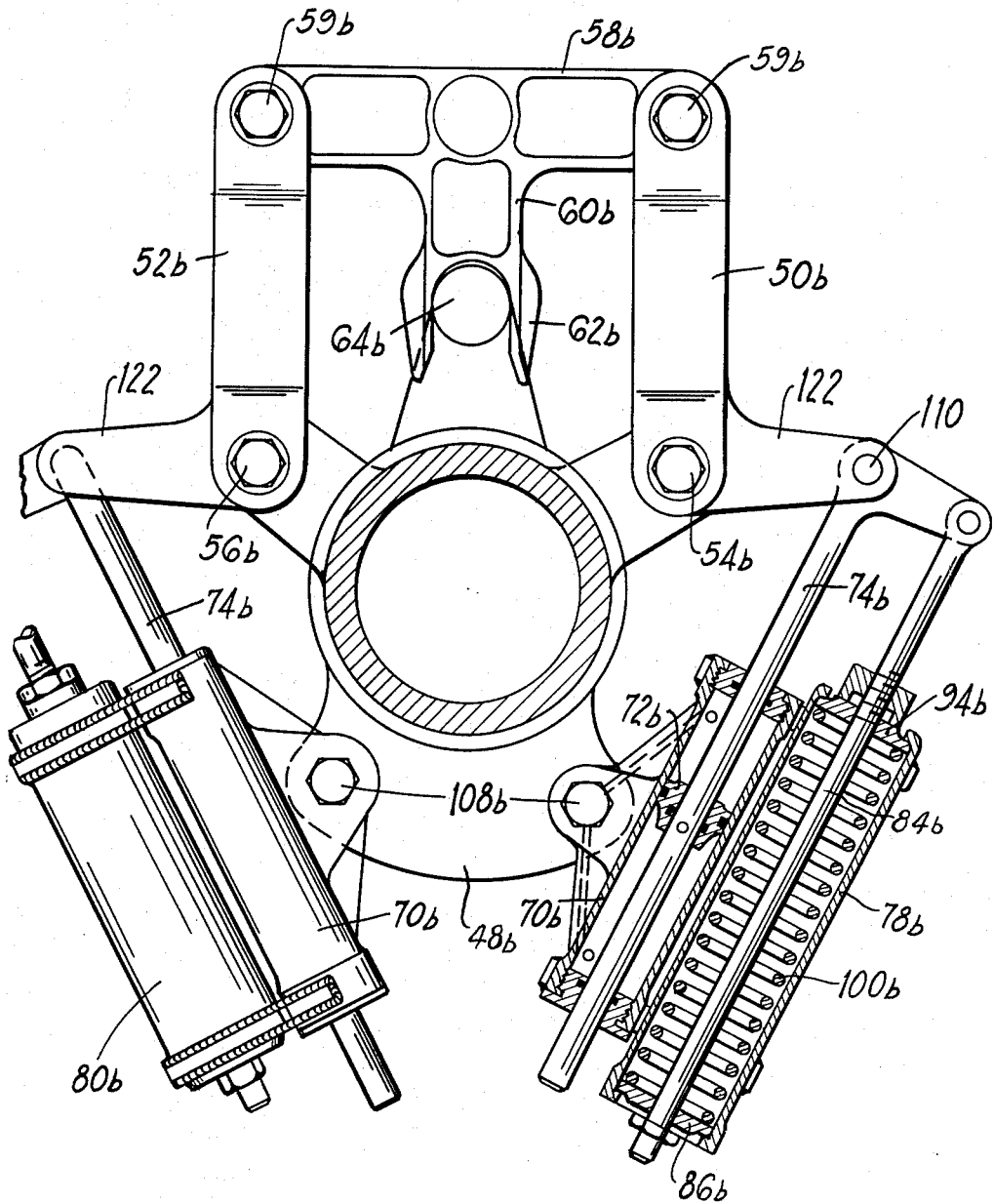

Figures 9, 10, and 11 are section views taken on lines 9—9, 10—10, and 11—11 of Figure 8;

Figure 12 shows the steering apparatus in Figure 8 when it has turned to its maximum extent in one direction;

Figure 13 is a top view of a further embodiment of the invention;

Figure 14 is a side view of Figure 13 with the actuator and return spring mechanism removed; and, Figures 15 and 16 are top and side views, respectively, of a further embodiment of the invention.

Figure 1:
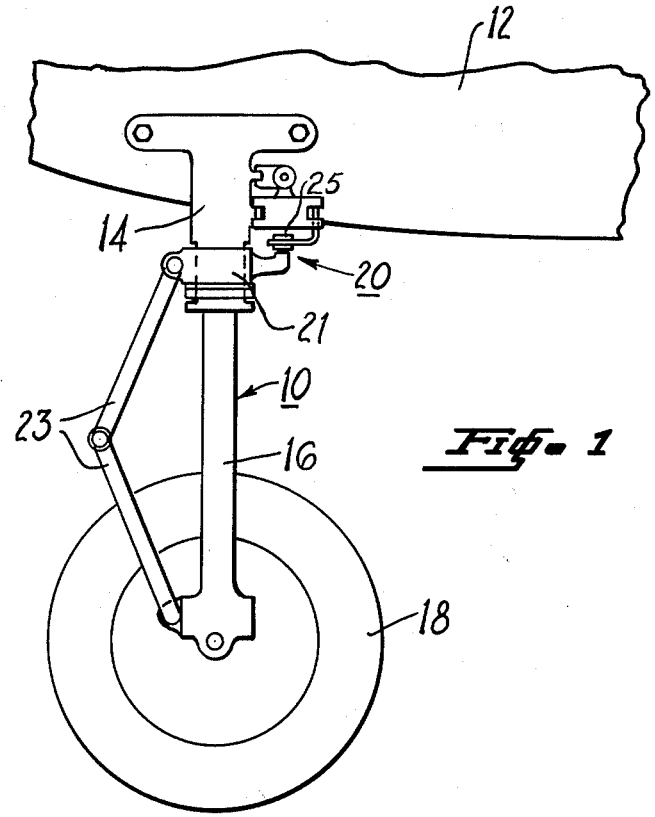
Figure 1 is a schematic view of an aircraft nose wheel strut with the steering apparatus provided thereon.

Referring to Figure 1, the nose wheel strut 10 depends from aircraft fuselage 12. The strut consists of a fixed tubular member 14 and a second tubular member 16, which is telescopically received in tubular member 14. At the end of tubular member 16 is a ground engaging wheel 18. The steering apparatus, indicated generally by reference numeral 20, is carried by tubular member 14. A collar 21 is turnably mounted on tubular member 14. Torque links 23 are fastened at one end to the collar 21 and the other end to the rotatable tubular member 16.

The steering mechanism works on the principle of turning the collar 21 through a desired angle and this will, acting through the torque links 23, pivot the wheel 18 which directs the path for the entire aircraft.

Figure 2:
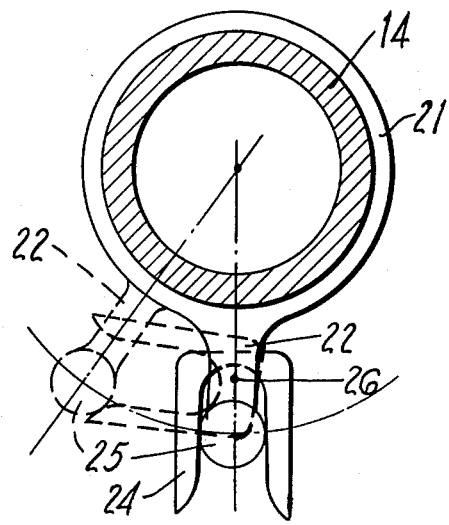

Referring next to Figures 2, 3, and 4, simplified schematic versions of steering principles will be considered.

Referring to Figure 2, the turntable collar 21 has a follower 25 attached thereto by means of a projection 22. The follower 25 which may consist of a roller, is power driven by means of a forked member 24. The forked member is driven in any suitable manner about its associated pivot 26 to obtain the desired degree of angular turning of the follower 25. As mentioned previously, it is necessary for the aircraft wheel to rotate through 360° and thus the collar 21 and follower 25 must also rotate through 360°. As a result, the forked member 24 must be so constructed that it will disengage from the follower 25 and because of this requirement, there is only a slight angularity through which the forked member 24 can engage the follower 25 before releasing. If the engageable angle is increased, then there is a problem of obtaining disengagement of the follower 25 and forked member 24 to permit 360° movement of the follower 25. The arrangement shown in Figure 2 is limited because of the relative locations of the centers of turning of the follower 25 and forked member 24.

There is some improvement over the the arrangement shown in Figure 2 by pivoting the forked member 24 farther from the center of turning of the follower 25. Note that the center of turning of the follower is the strut centerline. Thus, in Figure 3 follower 25 is located between its center of turning and the pivot 26 for forked member 24. By locating the pivot 26 farther from the center of turning for the follower 25, it is possible to increase the angularity through which the follower and forked member are drivably engaged.

I have found that the arrangement of Figure 3 is further improved by the arrangement shown in Figure 4. The basic geometry of all the example embodiments can be interpreted by reference to Figure 4. With the arrangement shown in Figure 4, the turnable collar 21 has operatively secured thereto a follower 25 just as in the previous arrangements. The driving means comprises two links 28 and 30 which are pivoted on nonrotatable portions 32 of the strut through pins or the like 34. The links 28 and 30 project from the strut and the projected ends are secured together by means of a cross link 36 having articulated pivot connections 38 with the projected ends of links 28 and 30. The links 28 and 30 are substantially parallel and they swing in unison to carry the cross link 36 therewith.

Midway between the ends of the cross link is a transverse portion 40 which extends toward the strut. End 42 of said transverse portion 40 is forked for drivable engagement with the roller follower 25. The forked end portion 42 moves in an arcuate path having a radius labeled "R" in Figure 4. The radius for this arcuate path is equal in length to the links 28, 30, and the center of the radius is at a point "P" on a line passing through the center of movement of the collar 21 and follower 25. The arcuate path traced by the forked end 42 diverges from the arcuate path traced by the follower 25 and the divergence of these two arcs tends to move the follower 25 out of engagement with the end 42. After a certain angular movement the follower 25 disengages from end 42 and thereafter moves free from the drive mechanism.

I have found that increasing the length of the radius for the arcuate movement of end 42 increases the angle through which the follower 25 and end 42 are drivably engageable. Thus, the available angle for power steering of the wheel is increased.

The arrangement shown in Figure 4 illustrates a basic principle involved in this invention which is increasing the radius of arcuate movement of the driving element relative to the radius of arcuate movement of the follower. The net result is an increased angle through which the follower 25 may be driven before becoming automatically disengaged to permit free swivelling movement of the wheel. The arrangement in Figure 4 is a substantial improvement over the arrangements shown in both Figures 2 and 3.

Referring next to the embodiment shown in Figures 5 through 7, these principles will be described in conjunction with a specific embodiment: Housing 44 is provided with a mounting portion 46 which is journalled in a nonrotatable support member 48 carried by the strut 14. The housing 44 is thus free to turn or swivel on the nonrotatable support member 48 of the strut. Two links 50 and 52 are also pivoted at 54 and 56 on the nonrotatable portion 48 of the strut at each side of the housing 44. Referring to Figures 5 and 6, there is labeled the axis of rotation for the links 50 and 52, and the axis of rotation for housing 44. Links 50 and 52 and housing 44 project from the strut, and the projected ends are connected by means of a cross link 58. The articulated connections 59 of the cross link 58 with the projected ends of the links 50, 52 and housing permit pivotal movement of the links and housing. The cross link 58 is thus carried by links 50, 52, and housing 44 and its movement is constrained to an arcuate path with the radius equal in length to the links 50 and 52. The cross link 58 has an extended portion 60 which projects toward the strut; end 62 of the extension is forked to adapt it for engagement with a roller follower 64.

The follower 64 (Figure 7) is secured to a turnable collar 66 through arm 68. The follower 64 (in this case a roller) produces turning of the collar 66 when the steering mechanism drives the follower 64 through a desired angle. The collar 66 is connected with the torque link of the strut to thereby cause the wheel 18 to turn as previously described (see Figure 1).

The forked end 62 moves in an arc with a radius equal to the length of links 50 and 52 and the center of this radius is on a line passing through the center line of follower 64 and the center line of the strut when the mechanism is in the normal position shown in Figure 5.

The arc described by end 62 diverges from the arc described by the follower 64 about the center line of the strut. When this divergence is sufficiently great, the follower 64 moves out of engagement with the forked end 62. As shown in Figure 7, the roller 64 and forked end 62 are drivably connected through about 60° before they disengage.

Within the housing 44 are formed two cylinder bores 70, one on each side of the mounting portion 46 for the housing. The cylinders 70 are formed at a slight angle within the housing. A piston 72 is slidably received in each of the cylinders 70; these pistons are responsive to pressure developed within the cylinder. A piston rod 74 is fastened between the piston 72 and cross link 58 through pin connections which permit pivotal movement of the piston rod at either end. When the pistons 72 slide in the cylinder bore 70 the piston rod is thus free to turn in accordance with arcuate movement of the cross link 58 and angular movement of the housing 44. The piston on the left hand side of the housing (Figure 5) is actuated to produce counterclockwise turning of the steering mechanism to the position shown in Figure 7.

The housing and steering components are held in the normal position shown in Figure 5 by a return mechanism which will next be described. Midway between the sides of the housing 44 (Figure 5) is an extension 73 thereof which serves as a carrier for two tubular members 78 and 80. The tubular members are rigidly held together on the extension by nuts 82. The cylinders 78 and 80 are securely fastened to the extension 73 and move angularly with the housing 44 as indicated in Figure 7. Within each of the identically constructed tubular members, is an elongated rod 84 which extends through the tubular member and has a nut 86 threadedly secured at the one remote end thereof which serves as an abutment. The other end of the rod is provided with a connector 88 through which there extends a pin 90 that is carried by the cross link 58. It will be noted that the connector 88 has an elongated opening 92 which permits angular movement of the rod 84 relatively to the cross link 58. Comparing Figures 5 and 7, it will be noted that the pin 90 moves along the length of the slot 92 as the tubular members 78, 80 and rods 84 are moved from their normal position.

A second abutment 94 is secured to the rod 84 by nut 95 to limit movement of the piston 96 while nut 86 limits movement of the piston 98. Helical springs 100 and 102 are compressed between piston 96 and 98 to develop force which is transmitted through the tubular members 78 and 80 to extension 73 and thence to housing 44.

The springs 98 and 100 are capable of exerting a turning movement on the housing 44 since they exert their force at a point offset from the axis of turning of the housing.

The end 104 of the tubular member 80 is provided with a shoulder 105 which is turned over to engage piston 98. When the steering mechanism is actuated by the power cylinders to the position shown in Figure 7, the linkage pivots in a counterclockwise direction and the tubular member 80 is pulled downwardly relative to the rod 84 to compress springs 100 and 102 against piston 96. The springs are thus loaded and develop a force on extension 73 which acts thereon in a direction offset from the center of turning of the housing 44. The compressed springs tend to return the linkage to its normal position and do so when the pressure in cylinder 70 on the left hand side of the housing 44 is released.

When the steering linkage pivots in a clockwise direction, piston 96 in tubular member 78 is moved upwardly by the cylinder 78 acting through abutment 94. The springs 100 and 102 are thus compressed against piston 98 which is held from movement through engagement with abutment nut 86. The compressed springs develop a load which is exerted on the extension 73 and thus transmitted to the housing 44 to return the housing to the normal position shown in Figure 5.

A short summary of the invention by way of explanation of a complete steering operation will next be given. Assume that the pilot wishes to steer the aircraft toward the left, and that this is obtained by swinging the steering mechanism shown in Figure 5 in a counterclockwise direction. Fluid pressure is communicated to the cylinder 70 in the left hand side of the housing 44, thus moving the piston 72 therein in an upwardly direction. The upwardly moving piston 72 exerts a force on the cross link 58 through the piston rod 74, thus causing the housing 44 and links 50, 52 to pivot in a counterclockwise direction. As the linkages swing toward the left, the cross link 58 remains substantially parallel to its original position as it moves along an arcuate path. The forked end 62 on the extension 60 of the cross link moves in an arcuate path to drive the follower 64 therewith. The follower 64 and end 62 remain in drivable engagement until the arcs of their respective paths diverge sufficiently to disengage the follower 64 from the end 62. Thereafter, the follower 64 can continue to rotate through a full 360° of movement, thus enabling the ground engaging wheel to swivel through any desired angle.

During ground handling, if the wheel 18 should be caused to swivel by an amount greater than the power steering angle by the ground handling means (such as a dolly or the like) then the follower 64 may continue to move in a counterclockwise direction. If this should occur, then the linkage will move clockwise toward a position where it will re-engage the follower at the right hand side of the vertical axis, this being accomplished in the usual manner. In other words, as the cam follower 64 moves completely around by continuing counterclockwise movement after it has disengaged from end 62, the steering mechanism can be caused to move sufficiently clockwise so that end 62 is in position to meet the counterclockwise moving follower 64. The mechanism which is provided for this, does not form part of the present invention and, hence, is not described in detail. This mechanism does provide, however, that the end 62 is in position to meet the follower 64 once the follower 64 moves into the prescribed angle of power steering. U.S. Patent 2,508,057, issued May 16, 1950 to A. E. J. Bishop illustrates in Figure 9 thereof one type of mechanism which operates in the above mentioned manner. While some modification of the apparatus shown in Figure 9 of Patent 2,508,057 may be required to adapt it for use with the present invention, such modification will be readily apparent to and easily performed by those persons skilled in the art.

Because the nose wheel is freely swivelled or casterable, it is important that means be provided for dampening shimmy of the wheel. To dampen shimmy, a restricted orifice not shown may be provided through which fluid is forced in exhausting from cylinder 70 to retard oscillation of the piston 72 in the cylinder 70. Since the pistons are retarded against oscillation, then the follower 64 is prevented from oscillating and the wheel 18 is thereby dampened against shimmy. Reference is made to U.S. Patent No. 2,866,609 issued December 30, 1958 to G. C. Stout and assigned to the present assignee, which patent discloses in detail a shimmy dampening arrangement of the type generally referred to above.

It will be noted from comparing Figures 5 and 7 that the cross link 58, although moved angularly, remains parallel to its original position. This is because the links 50, 52 and casing 44 form a parallelogram. This has some disadvantage in that the moment arm of end 62 steadily decreases and the effective turning effort exerted on follower 64 diminishes as the follower 64 moves angularly. If the pivot points 54 and 56 for links 50 and 52 are moved closer together, then the linkage will no longer form a parallelogram. In this case, the cross link 58 is tipped slightly as it moves in an arcuate path so that the sides of the forked end portion 62 bear at right angles against the follower 64 as the follower moves about the strut center line. This increases the mechanical advantage of the system but has the disadvantage of hindering release of the follower 64 with the end 62 to permit complete swivelling movement of the wheel.

It will be understood, however, that for certain applications it is possible to vary the geometry of the quadrilateral steering linkage so that the desired mechanical advantage and release angle can be obtained.

When the applying pressure in cylinder 70 is relieved, the springs 100 and 102 return the steering apparatus to the normal position shown in Figure 5 and in doing so, the aircraft wheel 18 is brought to a straight ahead position. The device is thus used as a wheel positioning means in addition to steering the wheel.

Referring next to the embodiment shown in Figures 8 to 12, parts of the steering mechanism which correspond to those in the previous embodiment will be referred to by the same reference numeral but with the subscript "a." Housing 44a has a mounting portion 46a which supports the steering apparatus for turnable movement in a fixed part of the strut 48a. Two links 50a and 52a are pivotally secured to fixed lugs 107 which are formed on the nonrotatable part of the strut 48a. A cross link 58a has articulated connections 59a at opposite ends thereof with links 50a and 52a, respectively. The articulated connections 59a between the cross link 58a and links 50a and 52a permit relative turning between the cross link 58a and links 50a and 52a. The cross link 58a is also mounted for swivelling movement at 61a and housing 44a and is supported thereby.

The cross link 58a has an extension 60a which projects toward the strut. The end 62a of the extension is drivably associated with a follower 64a which is operatively connected to a turnable collar 66a through arm 68a. Turning of the collar is arranged to steer the ground engaging wheel in the same manner as the previous embodiment.

The end 62a is forked so that the follower 64a and end 62a are releaseable. To actuate the steering mechanism there are provided two power cylinders 70a. The power cylinders are mounted for turning movement on the cross link at 108. A piston 72a is slidably received in each power cylinder 70a and a piston rod 74a has a pin connection 110 with lugs 112 on each side of the casing 44a. The pin 110 permits turning of the piston rod 74a on the lug 112. When the power cylinder is actuated, displacement of the piston 72a delivers thrust through the piston rod 74a to the casing 44a via lug 112, and thus causes turning of the casing 44a and links 50a, 52a. Compare Figures 8 and 12.

When the steering apparatus is actuated (Figure 12), the cross link 58a, extension 60a and end 62a are swung in an arc with a radius equaling the length of the links 50a and 52a. It will be noted from comparing Figures 8 and 12 that the cross link 58a remains parallel to its original position while it is being moved along an arcuate path.

Fluid pressure is communicated to the power cylinders through a fluid pressure distributing system which will next be described. Referring to Figure 9, an inlet port 109 communicates with any suitable fluid pressure source. Passages 111 and 113 conduct the fluid pressure to a distributor 114 which is mounted in the casing 44a. From the distributor 114, fluid is metered to each of the power cylinders through connectors 116 (Figure 11). The connectors 116 open to passages 118 and 120 (Figure 11) which lead to power cylinders 70a.

Casing 44a has an extension 73a which serves to mount two wheel centering devices. The wheel centering devices comprise tubular member 78a and 80a which are threadedly fixed to the extension 73a. Within each tubular member (Figure 9) is a rod 84a and two pistons 96a and 98a. The piston 98a is prevented from moving out of the tubular member by a turned over end portion 104a which serves to seat the associated piston. Piston 96a is prevented from movement by engagement with a shoulder 94a. The end 92a of rod 84a is connected with cross link 58a in the same manner as the previous embodiment in order to permit angular movement of the wheel centering device relative to the cross link 58a.

When the steering linkage is caused to move in a counterclockwise direction (Figure 12), the piston 98a in the left hand tubular member 80a is pulled toward the center line of the strut, thus compressing springs 100a and 102a; the piston 96a in the right hand tubular member 78a is forced away from the center line of the strut. When the steering linkage moves clockwise, this is reversed.

A short summary of the invention will now be given in the form of a description of a complete steering cycle.

Assume that the pilot of the aircraft wishes to steer the ship toward the left and this is accomplished by rotating the linkage in a counterclockwise direction. The nose wheel is rotated by the steering linkage to direct the path of the aircraft. From an appropriate pressure source (not shown) fluid pressure is regulated to inlet port 109 and communicated to the right hand power cylinder in Figure 8. The piston 72a therein moves on its power stroke and thus pulls piston rod 74a therewith. Since the point of connection of the piston rod 74a is through lug 112 which is offset from the turning axis of member 44a, a turning moment is developed which swings the casing 44a and links 50a, 52a in a counterclockwise direction. The cross link 58a, extension 60a and end 62a also swing in an arcuate path. The follower 64a through its connection with end 62a is caused to rotate about the center line of the axis, thus turning the rotatable sleeve 21a which is mounted on the strut, and thereby causes the wheel to pivot at its point of engagement with the ground. The arcuate movement of end 62a and roller 64a diverge (Figure 12) to cause disengagement of the roller 64a and the end 62a. When the roller 64a is free of the end 62a, the nose wheel can swivel independently of the power steering mechanism and is thus capable of moving through any angular arc to facilitate ground handling of the aircraft.

Just as in the previous embodiment, a mechanism is provided to coordinate the position of the steering mechanism so that the end 62a will always meet the follower 64a when the latter comes within the prescribed steering angle after having rotated freely therefrom. This mechanism is well known to those skilled in the art and is not described in detail since it forms no part of the present invention.

When the steering linkage is operated by the power cylinder, the pivotal movement of the linkage causes a compression of the springs in the wheel centering device 78a so that when the power devices are released, the compressed springs will exert a force offset from the pivotal axis of member 44a which produces a turning movement thereof returning the steering apparatus to the position shown in Figure 8. This return movement of the apparatus also moves the follower 64a to return to its original position (shown in Figure 8) thereby moving the wheel of the nose strut to a straight ahead position.

The nose wheel is prevented from shimmying by a restricted orifice which is incorporated in the power cylinder hydraulic system. This anti-shimmy device throttles fluid transfer and thus prevents oscillation of the follower 64a. The particular construction of the anti-shimmy valve is not shown since those skilled in the art are familiar with construction details. Again, reference is made to U.S. Patent 2,866,609 for details of one such type of anti-shimmy apparatus.

Referring next to the embodiment shown in Figures 13 and 14, parts of the apparatus corresponding to those in Figure 5 will be designated by the same reference numeral with the subscript "b."

Links 50b and 52b are mounted for pivotal movement at 54b and 56b on a nonrotatable support member 48b carried by the strut 14b. Links 50b and 52b are joined at their projected ends by a cross link 58b through articulations 59b. The cross link 58b is carried by links 50b and 52b and pivoted thereby. Links 50b and 52b cause the cross link 58b to swing in an arc, and the articulated connections 59b provide that cross link 58b remains parallel to its original position as it moves along an arcuate path. Cross link 58b has an extension 60b just as in the previous embodiments and the end 62b of the extension is forked for drivable connection with follower 64b which is disengageable from end 62b after the linkage has moved through a prescribed angularity. Disengagement of follower 64b from ends 62b permits complete swivable movement of the nose wheel.

Disengagement of the end 62b from the follower 64b results because the end 62b and roller 64b move along different arcs and their divergence at a given angle produces separation of the two. The linkage is caused to move by two power devices, each consisting of a cylinder 70b pivotally fastened at 108b to a fixed part of the strut. Reciprocably mounted in cylinders 70b are pistons 72b having piston rods 74b secured to lugs 122 which are extensions of link 50b and 52b, respectively. The connection 110 of the piston rod 74b with lug 122 permits pivotal movement between the rod 74b and the lug 122 as the power device produces a swinging of the linkage about 54b and 56b.

A wheel centering device is located in tandem with each of the power cylinders. The centering device comprises tubular members 78b and 80b, each having spaced stops 86b and 94b. A spring 100b is compressed between the two stops. Rod 84b which is connected to the lug 122 compresses the spring 100b by displacing either of 86b or pistons 94b within its associated tubular member.

The follower 64b is secured to rotatable collar 66b through arm 68b. When the steering mechanism is operated, one of the power cylinders is actuated to produce swinging of the linkages in either a clockwise or counterclockwise direction. Swinging of the linkage drives the follower 64b therewith until end 62b and follower 64b separate at the extreme angularity of power steering. Thereafter, the roller 64b may continue to swivel to facilitate ground handling and means are provided to coordinate the location of the end 62b and position of the follower 64b so that they reengage when the follower 64b once again moves within the prescribed angle of power steering.

The nose wheel may be dampened against shimmy by providing a suitable restricted orifice arrangement within the hydraulic system which actuates the power cylinder. By throttling fluid flow, the wheel is held through the steering apparatus against shimmy or oscillation.

The wheel is returned to a straight ahead position by the wheel centering devices after the aircraft has taken off. Springs 100b return the linkage to the position shown in Figure 13 and in doing so, the wheel is brought to a straight ahead position and the gear is retracted with this wheel position.

With the embodiment shown in Figures 15 and 16, the links 50c and 52c are pivotally supported on a non-rotatable part of the strut as indicated at 54c and 56c. The cross link 58c is bow shaped to provide the necessary inward extension so that end 62c drivably engages follower 64c. Cross link 58c has articulated connections 59c with the projecting ends of links 50c and 52c so that the cross link, while moving in an arcuate path, remains parallel to its original position. End 62c and follower 64c are disengaged by divergence of their respective arcuate movements. This divergence occurs as the linkage is caused to move in a rightward or leftward direction. The steering device is operated by a power device comprising a cylinder 70c, which is pivotally mounted at 108c to link 52c and piston 72c which is connected through a piston rod 74c that has a pin connection with lug 112c. The lug 112c extends from a nonrotatable part of the strut.

The wheel positioning device comprises a torsion spring 100c which is rotated by a lever 124. At the end of the lever is a cam follower 126 which bears against the rotatable cam surface 128.

When the steering apparatus is actuated, cam surface 128 is moved with the rotatably driven portion of the strut and the cam follower 126 is displaced, thus loading torsion spring 100c. When the power device is released, the torsion spring 100c returns the linkages to the position shown in Figure 15, also causing the follower 64c to return to its original position. The wheel is brought to a straight ahead position when the follower 64c is located as shown in Figure 15.

When the power device is actuated, the linkage moves either to the right or to the left, causing the cam follower 64c to move therewith. The linkage is caused to swing in one direction or the other about pivots 54c and 56c to steer the nose wheel. End 62c and follower 64c are disconnectible to permit complete swivelling movement of the nose wheel to facilitate ground handling. End 62c and follower 64c are reengageable after they are separated by a device which locates end 62c in relation to follower 64c as it moves within the prescribed power steering angle.

Although this invention has been described with only a few selected embodiments, it will be understood by those skilled in the art that numerous changes and modifications may be made without departing from the underlying principles of the invention.

I claim:

1. In an aircraft undercarriage, a strut comprising a fixed tubular member, a second tubular member slidably received in said fixed tubular member and rotatable therein, a first link member pivoted at one side of the strut and operatively secured to said fixed tubular member, a second link member pivoted at the other side of the strut and operatively secured to said fixed tubular member at the same level as said first link, said first and second links projecting from said strut and transversely to the longitudinal axis of said strut, means pivotally interconnecting the projecting ends of said links so that said links swing in unison on their respective pivots at said strut and maintain relative parallelism for all angular positions thereof, a third link fastened to said means and projecting therefrom toward said strut in parallelism with said first and second links, a forked end portion on said link, means operatively connected to the rotatable second tubular member, a follower associated with said last mentioned means and received within said forked end portion of said third link to be driven thereby, swinging movement of said first, second, and third links serving to angularly move the rotatable portion of said strut until said follower disengages from the forked end portion of said third link, operator-controlled power means associated with said first and second links to produce swinging movement of said links, and centering means for returning said links to a predetermined position when said power means are released.

2. In an aircraft undercarriage, a steering apparatus comprising a fixed tubular member, a rotatable tubular member mounted in said tubular member and operatively connected to an aircraft wheel, two spaced apart parallel links, one pivoted on each side of said fixed tubular member, means connecting the projecting ends of said links to retain parallelism of said links as said links pivot, a third link secured to said means and extending toward said strut, a follower operatively secured to said rotatable tubular member and adapted to impart angular movement thereto, the end of said third link being drivably connected to said follower through a given arc to produce angular movement thereof when said links are caused to pivot, said follower and the associated end of said third link being disengageable beyond said given arc to permit complete rotation of said follower and rotatable tubular member, operator-controlled power means drivably connected with said apparatus to produce pivotal movement of said links, and a mechanism for returning said links to a normal location when said power means are released.

3. In combination with an aircraft strut, a steering mechanism including, a fixed and a rotatable tubular member, a follower operatively secured to said rotatable tubular member, said follower being rotatable about the center line of said rotatable member, a link drivably connected to said follower through a fixed angle, said link and follower being disengageable beyond said angle to permit complete rotation of said follower, spaced apart means pivotally secured to the strut and extending in advance thereof, said link being pivotally supported on the projected portions of said means to be impelled along an arc whose radius is substantially equal to said means, the center of said arc being displaced from said means by a distance substantially equalling the length of said link, the radius for arcuate movement of said link being greater than the radius of turning of said follower.

4. In combination with an aircraft strut, a steering apparatus comprising a quadrilateral linkage, the base leg of said quadrilateral being a part of the aircraft strut, the two spaced legs of said quadrilateral being hinged to said strut and swingable thereon, the fourth leg of said quadrilateral having a jointed connection at opposite ends thereof with said spaced legs to permit swinging movement of said fourth leg about said strut, a link secured to said fourth leg and projecting toward said strut, a follower device which is operatively secured to a rotatable member of said strut, the end of said link being adapted for drivable engagement with said follower through a given angularity and is thereafter disengageable to permit continued rotation of said follower, the centers and lengths of the respective radii of arcuate movement of the drivably adapted end of said link and follower being relatively located to obtain the desired angularity through which the link end and follower are drivably engaged.

5. In combination with an aircraft strut having a steerable member, a steering apparatus comprising three articulated links, two of said links being substantially parallel and pivoted at the ends thereof on said strut, said parallel links projecting from said strut, the third of said links joining the projected ends of said parallel links so that said third link swings through an arc with the radius and center thereof determined by said parallel links, a fourth link operatively attached to said third link and projecting toward said strut, a follower operatively connected to the steerable member of said strut, the end of said fourth link projecting toward said strut being drivably connected with said follower through a selected angularity and thereafter disengageable from said roller to allow continued rotation of said follower, the angularity of engagement of said follower and fourth link being determined by the relative lengths and centers of the radii of arcuate movement for the follower and fourth link, respectively, and power means operatively associated with said links to produce pivotal movement thereof.

6. A steering apparatus according to claim 5 wherein two projecting lugs are formed on the parallel links, and the power means comprise two pivoted cylinders, and a piston and piston rod in each of said cylinders, said piston rods being operatively connected to said lugs to transmit turning effort to said parallel links.

7. A steering apparatus according to claim 6 wherein centering means are secured to at least one of said lugs to return the linkage to a desired position when the power means are released.

8. A steering mechanism according to claim 5 wherein the radius and center thereof of movement of the drivable end of said fourth link is related to the radius and center of movement of the follower to obtain up to 60° of drivable interconnection before roller and drivable end of the fourth link disengage.

9. In combination with an aircraft strut, a steering apparatus comprising two links secured at spaced points on said strut and swingable thereon, a third link with the opposite ends thereof pivotally secured to the projecting ends of said first and second links, said third link being of such a length that the first and second links are located in parallel relation, said third link being extended toward said strut, a follower means operatively connected to a steerable member of said strut, an inwardly projecting portion of said third link drivably associated with said follower means through a prescribed angularity to impart rotational movement thereto when said links are caused to pivot, said projecting portion and follower means being releasably associated beyond said prescribed angularity to permit free rotational movement of said follower means which can describe complete circular movement.

10. A steering apparatus according to claim 9 wherein power means are provided to produce pivotal movement of said linkage, said power means comprising a cylinder secured to one of the parallel projecting links and a piston operatively secured to a fixed part of the strut, said power means being double-acting to pivotally urge the linkage in either direction.

11. A steering linkage according to claim 9 wherein means are provided for returning said linkage to a given position following pivotal actuation thereof, said means comprising a torsion spring associated with one of said parallel links, a spring arm secured at one end to said torsion spring, a cam which is turnable by rotational movement of said strut, and a cam follower associated with said cam and arranged to turn said lever to load the torsion spring during angular movement of said strut out of its normal position.

12. In combination with an aircraft strut having a steerable member, a steering apparatus comprising two substantially parallel members which are secured to the strut and swingably associated therewith at spaced points thereon, means secured to the ends of said members by articulated connections permitting swingable movement of said members, said means being carried by said members and movable in an arcuate path with a radius length determined by the length of said parallel members, a follower member operatively secured to the steerable member of said strut, and a lever operatively connected to and movable with said means, said lever being drivably engageable with said follower member through a selected angle.

13. A steering apparatus for aircraft comprising a strut having a fixed portion and a steerable portion, a housing swivelled on the fixed portion of said aircraft strut, two links pivotally secured to the fixed portion of said aircraft strut, one on each side of said housing, means connecting the projected ends of said links and housing by articulated connections therewith, said means further including a portion projecting toward said strut, a follower member secured to said steerable portion of said strut and adapted to produce movement thereof, the projecting end portion of said means being adapted for drivable engagement with said follower through a predetermined angle, said follower member being releaseable from said means at angles different than said predetermined angle to enable complete rotation thereof.

14. A steering apparatus according to claim 13 wherein said housing is formed with a cylinder bore, a piston slidably received in said cylinder bore, and a cylinder rod pivotally fastened at opposite ends thereof to said piston and means so that movement of said piston imparts force to said links and housing to produce swinging movement thereof.

15. A steering apparatus according to claim 13 wherein a return mechanism is used to hold the linkage in a normal position while the apparatus is idle, said return mechanism comprising a first member secured to said housing and offset therefrom, a second member secured to said means, and a resilient element operatively connected between said first and second members which is loaded by relative movement occurring between said members during movement of the apparatus from a normal position, the force developed by said resilient means serving to return said apparatus to a normal position when the apparatus is idle.

16. A steering apparatus according to claim 15 wherein two of said return mechanisms are provided, means for supporting said return mechanism, said supporting means being connected to said housing, one of said return mechanisms located on each of opposite sides of the swivelled connection of said housing with the strut.

17. A steering apparatus according to claim 14 wherein two cylinder bores are formed in said housing, one on each side of the swivel connection of the housing with said strut, each of said cylinder bores having a piston slidable therein, and two piston rods pivotally connected at opposite ends thereof to said pistons and means, respectively, whereby actuation of one piston produces turning of the apparatus in one direction and actuation of the other piston produces turning of the apparatus in an opposite direction.

18. In combination with an aircraft strut having a steerable member, a steering apparatus comprising a first member mounted on said strut for swingable movement thereon and a link mounted on each side of said member to said strut, means having articulated connection with each of said links and member and carried thereby, a follower means operatively connected to the steerable member of said strut, said first mentioned means including a portion adapted for drivable connection with said follower means through a predetermined angle.

19. A steering apparatus according to claim 18 wherein two transverse extensions are formed on said first member which are offset from the mounting of said first member on said strut, a power device pivotally secured to said means at a location offset from the mounting of said first member; said power device including a piston and piston rod operatively connected to one of said transverse extensions, said power device being actuatable to produce turning of the apparatus.

20. A steering apparatus according to claim 19 wherein a return mechanism is used to hold the apparatus in a normal position while the power device is idle, said return mechanism including two relatively movable members which are offset from the mounting connection of said first member, one of said relatively movable members being operatively secured to said first member and the other of said members operatively secured to said means, resilient means connected between said two relatively movable members which are loaded by the relative movement of said members to develop force utilizable for returning said apparatus to its normal position.

21. A steering apparatus in combination with an aircraft strut having a steerable member comprising two members operatively secured to said strut at spaced points thereon, said members having projecting end portions being adapted for swingable movement about said strut, and means having articulated connection with the projecting end portions of said members and carried thereby, said means having a portion extending toward said strut and adapted for drivable connection with the steerable member of said strut, said members being relatively inclined from parallelism so that movement thereof produces a composite circular and tipping movement of said means.

References Cited in the file of this patent

UNITED STATES PATENTS

| | | |
|---|---|---|
| 2,028,451 | Hodge et al. | Jan. 21, 1936 |
| 2,508,057 | Bishop | May 16, 1950 |

FOREIGN PATENTS

| | | |
|---|---|---|
| 859,585 | France | Dec. 21, 1940 |